J. L. HART.
COTTON MACHINERY.
APPLICATION FILED MAY 19, 1920.
1,428,434. Patented Sept. 5, 1922.
5 SHEETS—SHEET 5
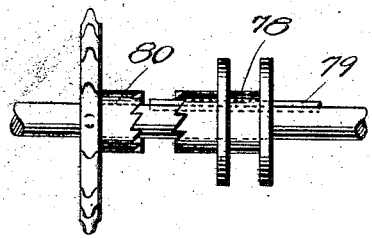
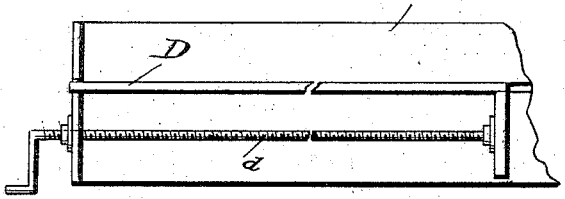
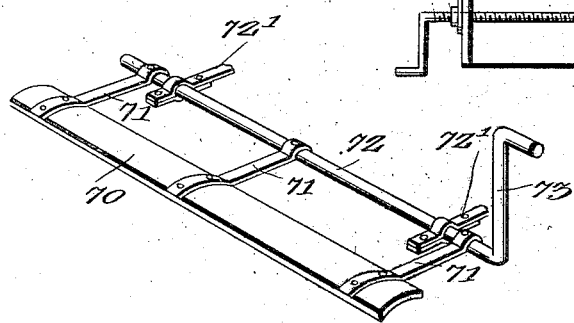
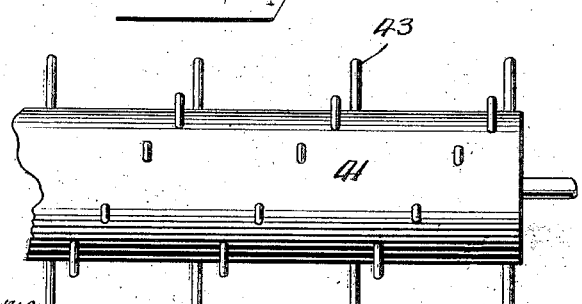
WITNESSES
George C. Myers
W. F. Buckley
INVENTOR
J. L. HART,
BY
ATTORNEYS Patented Sept. 5, 1922.

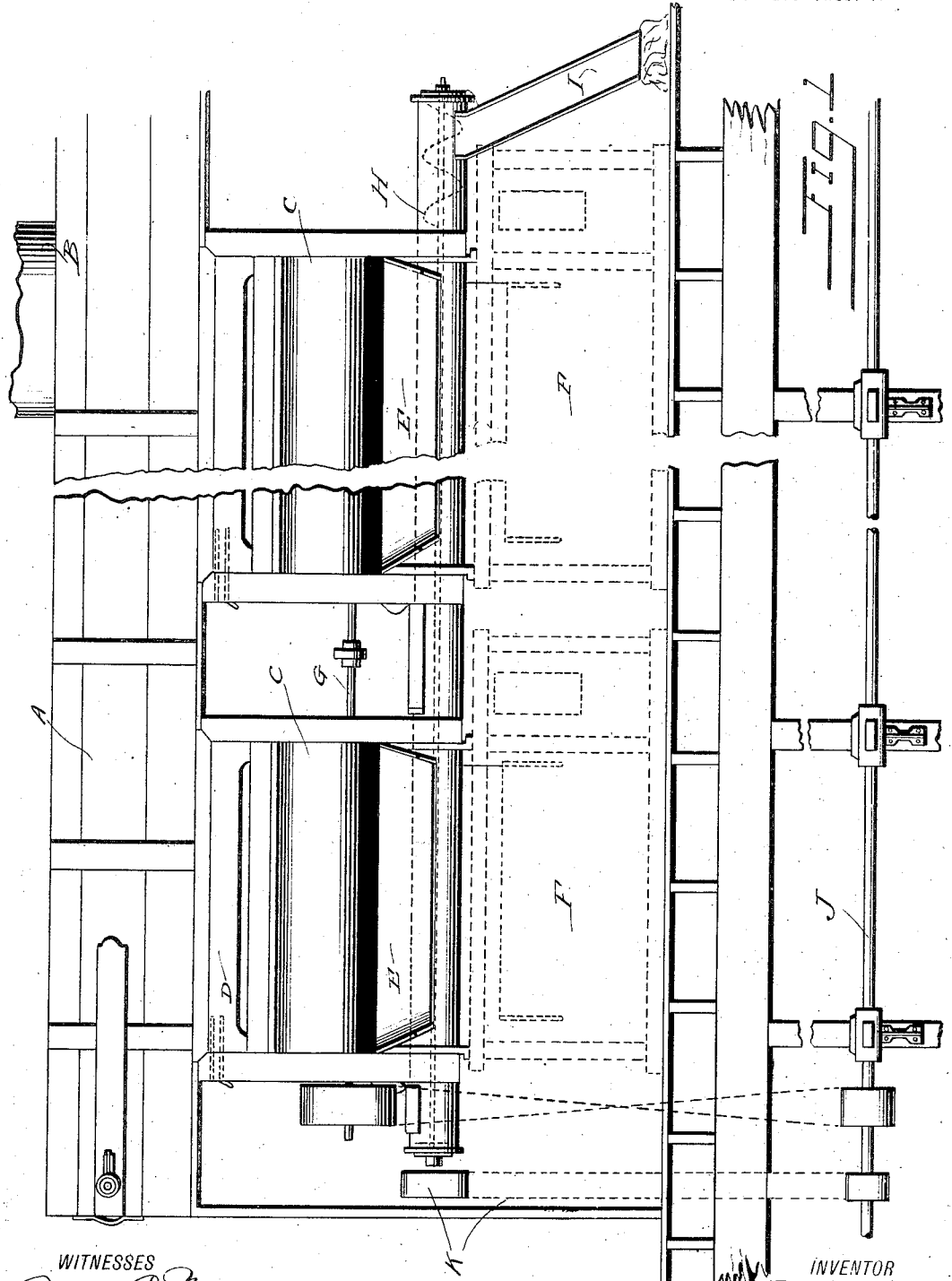

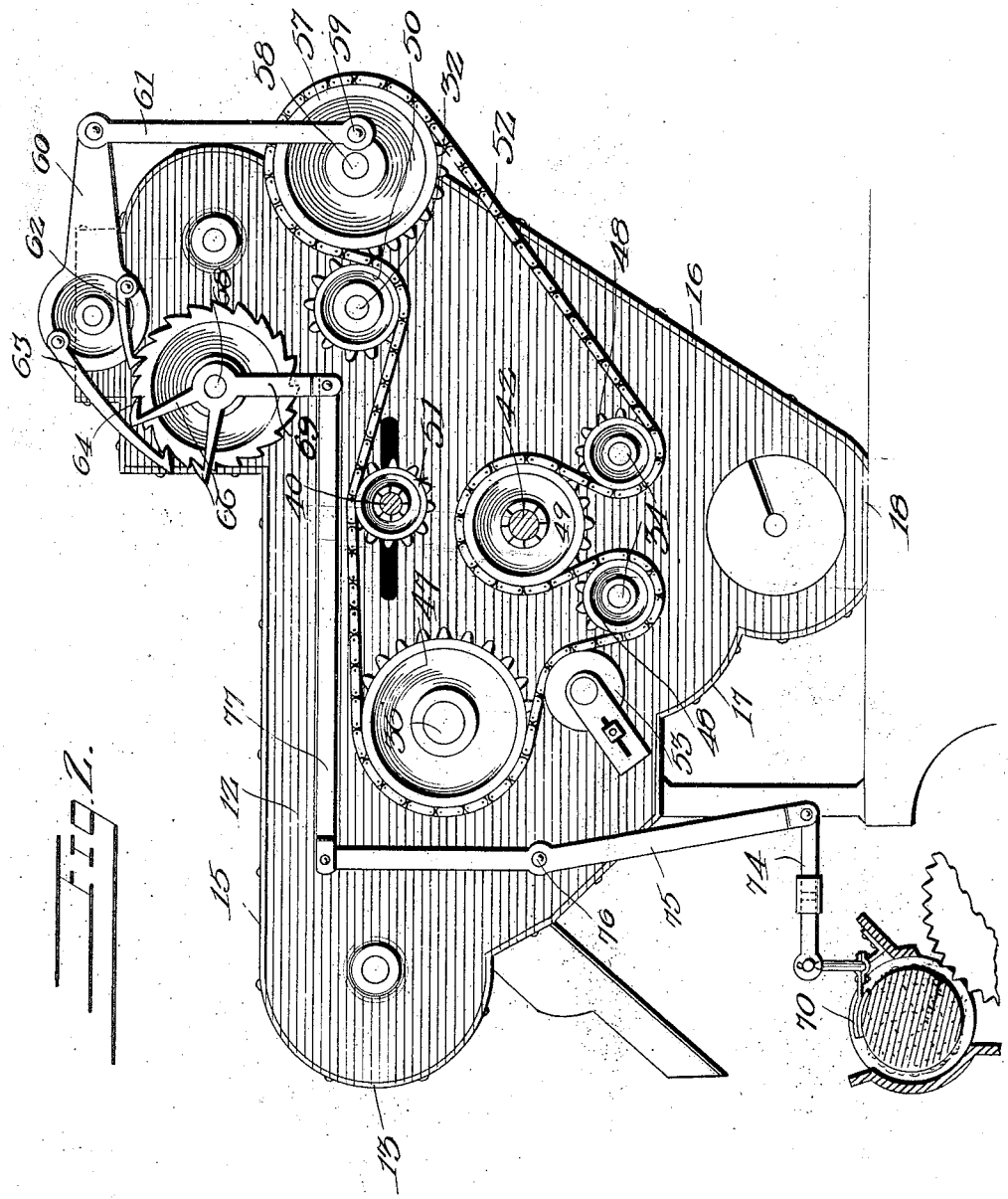

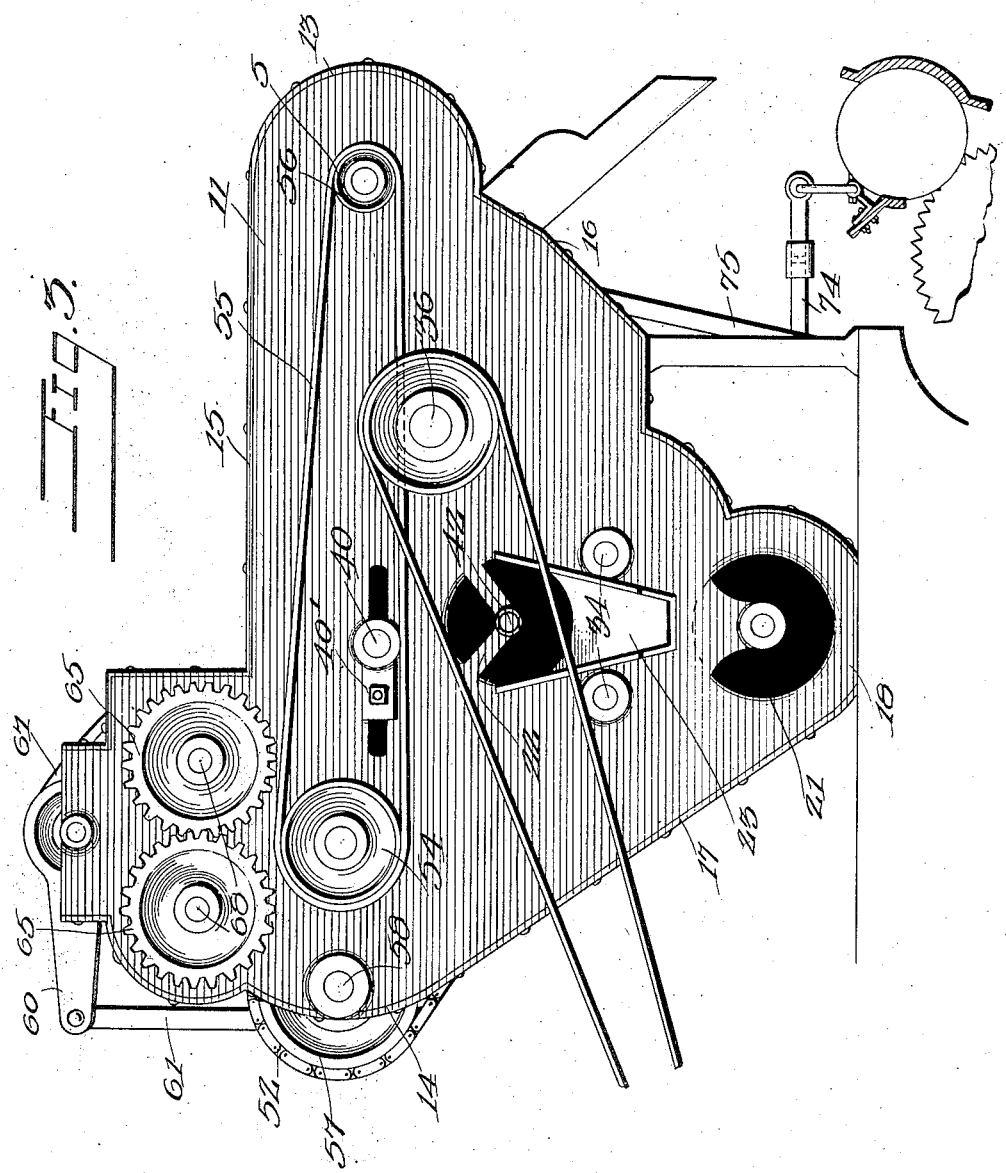

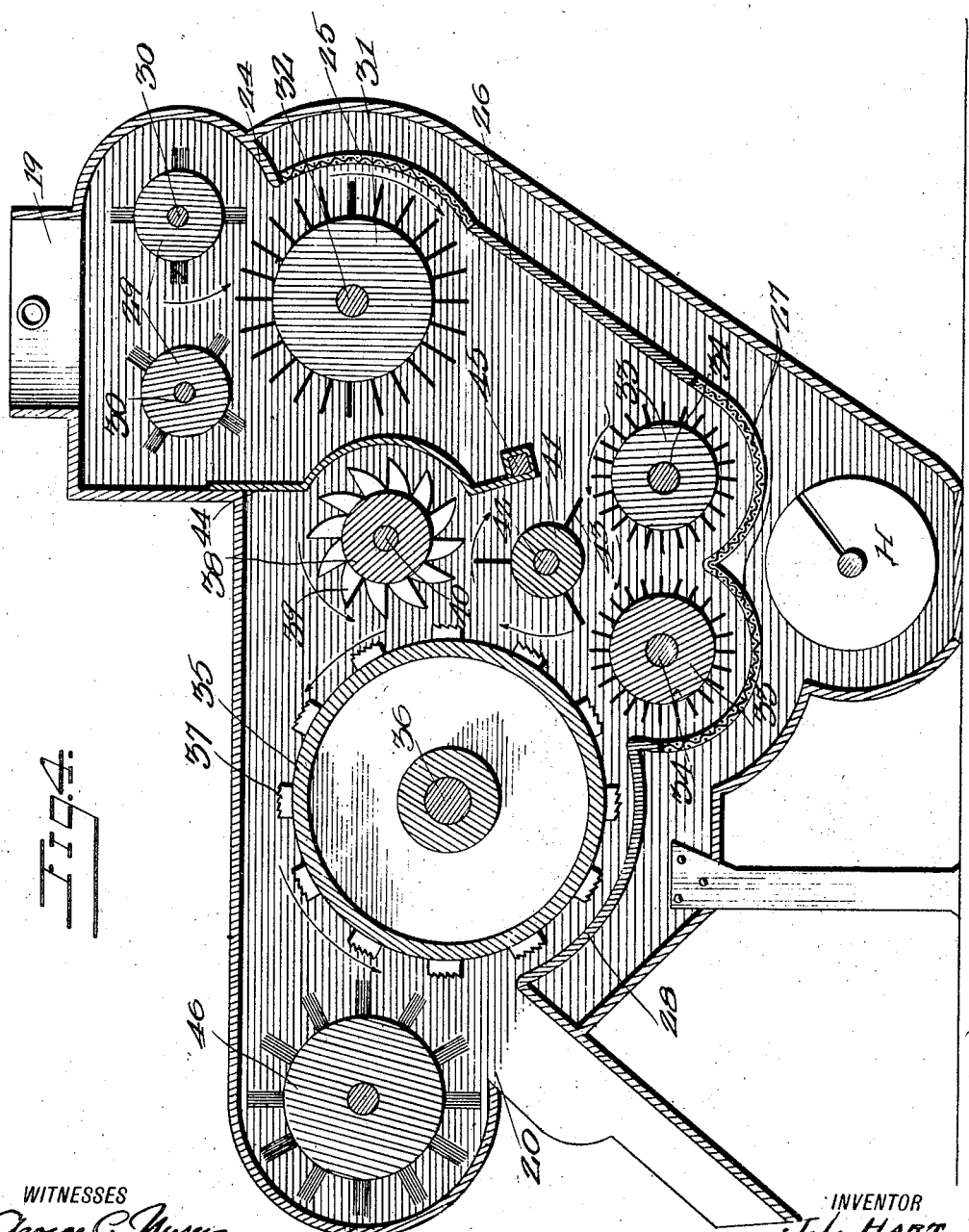

1,428,434

UNITED STATES PATENT OFFICE.

JOSEPH LUTHER HART, OF CHICKASHA, OKLAHOMA.

COTTON MACHINERY.

Application filed May 19, 1920. Serial No. 382,460.

*To all whom it may concern:*

Be it known that I, JOSEPH LUTHER HART, a citizen of the United States, and a resident of Chickasha, in the county of Grady and State of Oklahoma, have invented certain new and useful Improvements in Cotton Machinery, of which the following is a specification.

This invention relates generally to cotton machinery, and more particularly to an improved cotton machine especially adapted to carry out those phases in the manufacture of cotton prior to ginning.

The object of the invention is to provide a machine of this character which receives the cotton as it comes from the field, being especially adapted for handling roughly picked or bolled cotton, separates the hulls and foreign matter from the cotton, segregates the cotton on the one hand and the hulls and foreign matter on the other, discharges the hulls and foreign matter, and feeds the cleaned segregated cotton to the gin.

Another important object is to provide a machine of this character with an improved automatic feed controlled by the gin and separate from and independent of the instrumentalities embodying the gin and the feeder.

Another object is to provide a machine of this character of simple and durable construction, reliable in operation and easy and inexpensive to manufacture and in which the parts are easily accessible for replacement, adjustment or repair.

Other objects and advantages of the invention reside in certain novel features of construction, combination and arrangement of parts which will be hereinafter more fully described and particularly pointed out in the appended claims, reference being had to the accompanying drawings forming part thereof, and in which:

Figure 1 is a front elevational view of a battery of gins embodying my invention;

Figure 2 is an elevational view of one side of the combined feeder and cleaner;

Figure 3 is a similar view of the opposite side;

Figure 4 is a longitudinal vertical section of the combined feeder and cleaner;

Figure 5 is a detail view of the clutch for the sprocket of the spiked cylinder and of the stripper;

Figure 6 is a detail view of the spiked roll of the huller;

Figure 7 is a detail view of the gin control of the automatic feed; and

Figure 8 is a detail view of the slide board.

Referring to the drawings and especially to Figure 1, wherein is shown a battery of gins, feeders, etc., it will be seen that the invention contemplates a distributor A which receives the cotton from the elevating system B and then supplies it to the combined feeders and cleaners, indicated generally at C. A slide board D regulates the amount of cotton admitted from the distributor to each combined feeder and cleaner C. A gin F is arranged beneath each of the combined cleaners and feeders C and receives the cleaned cotton therefrom by means of the cotton slide E. The instrumentalities of the combined feeder and cleaner C which will be hereinafter more fully described, are actuated from a common drive shaft G. The refuse which has been separated and segregated from the cotton by the cleaner C is delivered to a screw conveyor H which extends through all of the feeders and which deliver the refuse by means of a chute I to any suitable point. This screw conveyor provides a common means for carrying off the refuse of the several cleaners. A line shaft J serves to drive both the shaft G and the conveyor shaft to the screw conveyor H, suitable motion transmission means serving to communicate the motion of the line shaft to the drive shaft G and conveyor shaft being provided and being embodied preferably in the form of a belt and pulley transmission, indicated at K.

The combined feeder and cleaner C comprises a casing consisting of a pair of side walls 11 and 12, front and rear walls 13 and 14, a top wall 15 and inclined bottom walls 16 and 17 which with the flat bottom wall 18 constitute a bottom.

The casing is provided with a cotton inlet from the distributor, indicated at 19, and it is this inlet that the slide board D which is provided with adjusting means $d$ serves to throttle. The remote end of the casing is provided with a cotton outlet 20 which delivers the clean cotton to the cotton slide E and thence to the gin. The main refuse outlet 21 is provided in the lower portion of the side wall 11 and above this main refuse outlet and in vertical alinement therewith is provided an auxiliary refuse outlet indicated at 22. A chute 23 conveys the refuse from the auxiliary outlet to a suitable trap in the conveyor boxing of the conveyor H.

As shown in Figure 4 the interior of the casing is provided with a false bottom 24 which includes an upper reticulated portion 25, an intermediate inclined and imperforate portion 26, lower reticulated portions 27 and a lower imperforate portion 28.

A pair of feed rollers 29 are provided adjacent the cotton inlet 19, each of the feed rollers being mounted upon a feed roller shaft 30 which is journaled in suitable bearings provided therefor in the side walls 11 and 12 of the casing. Below the feed rollers and adjacent the upper reticulated portion 25, a picker cylinder 31 is arranged, and is mounted upon a picker cylinder shaft 32, journaled in suitable bearings in the side walls 11 and 12 of the casing, the shaft 32 being disposed parallel to the shafts 30 and preferably intermediate or midway between these shafts. The picker cylinder receives the cotton from the feed rollers and throws the same against the reticulated portion 25 of the false bottom. The surface and other loose dirt carried by the cotton is separated from the cotton by this action as this dirt is projected through the reticulated portion 25 and thence to the refuse conveyor H while the cotton falls from the reticulated portion 25 along the imperforated portion 26 as the reticulated portion 25 is substantially vertical although it conforms generally to the contour of the picker cylinder. The picker cylinder and the upper reticulated portion comprise means for giving the cotton a preliminary cleaning.

The cotton as it reaches the lower end of the imperforate inclined portion 26 of the false bottom is picked up by the adjacent member of a pair of picker rolls 33. Each of the rolls 33 is arranged on the picker roll shaft 34 which is journaled in suitable bearings in the side walls 11 and 12 of the casing.

A saw cylinder 35 is mounted upon the saw cylinder shaft 36 which has its ends journaled in the side walls of the casing. On the periphery of this cylinder is a plurality of saws 37 which are preferably U-shaped in cross section and which receive the cotton from the picker rolls. The saw cylinder is arranged in the casing so that the picker rolls are disposed to one side and adjacent the lower end thereof. A stripper 38 cooperates with the saw cylinder and serves to remove the hulls and all foreign matter from the cotton as the teeth 39 of the stripper extend between the teeth of the saw and intercept the hulls and the foreign matter and carry them away from the saw cylinder while permitting the lint to be carried around by the saw cylinder in a substantially undisturbed condition. The stripper is arranged to one side and adjacent the upper end of the saw cylinder and is mounted upon the shaft 40 rotatably journaled in suitable bearings provided therefor in the casing. A spiked cylinder 41 is mounted upon its shaft 42 journaled in the casing and is arranged adjacent the saw cylinder and intermediate the stripper and the picker rolls. As clearly shown in Figure 6, the spikes 43 of the cylinder 41 are arranged spirally about the periphery of the cylinder and in such manner that the foreign matter or refuse which is delivered to the spike cylinder from the stripper is carried in one direction toward the auxiliary refuse outlet 22 which is disposed adjacent one end of the spiked cylinder. A partition 44 is arranged in the interior of the casing and extends around the stripper 38 and in front of the spiked cylinder 41. The partition serves to define the hulling chamber of the huller and cleaner which is comprised by the picker rolls, saw cylinder, stripper and spike cylinder, which elements constitute means for hulling the cotton and releasing all of the foreign matter therefrom. The partition 44 also serves as a deflector or baffle to constrain the refuse matter to motion in one direction toward the auxiliary refuse outlet 22. As shown in Figure 4 the upper end of the partition is supported upon the top wall of the casing and the lower part of the partition is extended around and supported by a transverse bar 45.

A doffer brush 46 coacts with the saw cylinder to remove the lint therefrom and deliver the cotton thereto to the cotton outlet.

The screw conveyor H is arranged in the lower part of the casing below the reticulated portions 27, and this screw conveyor picks up the refuse matter which finds its way through the reticulated portions 27 and through the reticulated portions 25 and carries the same from the casing. The auxiliary refuse outlet 22 to which the spiked cylinder 41 delivers its refuse also discharges the refuse to the conveyor H through the chute 23.

The drive shaft G herein-above referred to is continuous with and constitutes a part of the saw cylinder shaft 36 and the other instrumentalities of the combined cleaner and feeder are driven from this shaft 36. The ends of the saw cylinder shaft 36, picker roll shafts 34, spiked cylinder shaft 42, picker cylinder shaft 32 and stripper shaft 40 are extended beyond the side wall 12 and carry respectively sprocket wheels 47, 48, 49, 50 and 51. A sprocket chain 52 extends around these sprockets and in mesh with the teeth thereof. A suitable chain tightening 53 is also provided. It is obvious that as the saw cylinder shaft 36, which is a part of the drive shaft G, is driven from the line shaft, the picker rolls, picker cylinder, spike cylinder and stripper are driven from the saw cylinder shaft by means of the sprocket gearing. The shaft 32 of the picker cylinder is extended also beyond the opposite side wall 11 and carries a pulley 54 which through the belt 55 and pulley 56 drives the doffer brush 46.

The bearing for the stripper is an adjustable bearing of conventional construction, as indicated at 40′ in Figure 3.

The feeding means for actuating the feed rolls 29 comprises a sprocket wheel 57 which is rotatably mounted on a stub shaft 58 and which is driven from the sprocket chain 52. The sprocket constitutes a crank disk and is provided with a crank pin 59. The crank pin 59 imparts an oscillatory movement to the rock arm 60 through the connecting rod 61. The rocker arm 60 carries pawls 62 and 63 which alternately engage the teeth of the ratchet wheel 64 carried upon one end of one of the feed roller shafts 30. In this manner for each oscillation of the rocker arm two impulses are imparted to the feed roller and as seen in Figure 3 the remote end of the feed roller shaft carries twin gears 65 which mesh with each other to constrain the feed rollers to corresponding movement.

Automatic means is provided for controlling this feeding mechanism. This automatic means is separate from and independent of the instrumentalities embodying the feeder and the gin, although it is itself under the control of the gin, and is operated when the roll in the gin is of such volume as to exceed the efficient working capacity thereof. This automatic control mechanism consists of a pair of dogs 66 carried on arms which radiate from the collar journaled on the end of the feed roller shaft 30 which is extended for this purpose. The collar is provided with an arm 69 which is preferably integrally formed therewith. The upper surface of the dogs 66 is smooth and when these dogs are disposed beneath the pawls 62 and 63 the pawls ride upon this smooth surface and do not impart any movement to the ratchet wheel 64. The normal position of these dogs however is as seen in Figure 2, that is, out of the path of movement of the pawl so that they are effective to impart motion to the ratchet wheel.

For controlling the position of the dogs, a floating breast plate 70 is disposed in the roll box of the gin F and engages the roll, and when the roll in the roll box exceeds efficient working volume, the floating breast plate 70 is actuated and its motion is transmitted to the dogs 66 to move them into the path of the pawls and prevent the pawls from further actuating the feed rollers. As shown in detail in Figure 7 this float breast plate 70 is carried on the end of arms 71 which are fixed to a shaft 72 journaled in bearings 72′ and carrying the crank 73. An adjustable pitman 74 connects the crank to the lever 75 fulcrumed on the casing at 76 and connected by link 77 to the arm 69 of the collar carrying the dogs. It is thus seen that when the roll is of normal volume, the breast plate permits the dogs to occupy their normal position away from and out of the paths of the pawls and the motion of the ratchet wheel does not influence the dogs in this respect, but that when the roll exceeds its proper volume the dogs are positioned beneath the pawls as herein-above described.

In feeding and cleaning the cotton which is hand picked or which has been previously cleaned, it is not always necessary to employ the stripper and spike cylinder and for this reason means are provided whereby these instrumentalities are idle during the treatment of this kind of cotton. This means comprises a clutch which is shown in detail in Figure 5, and by which the sprockets 49 and 51 may be selectively engaged or disengaged from their respective shafts, it being understood that one such clutch member is provided for each of the sprockets. This clutch consists of a slidable clutch member 78 connected to the shaft, as at 79, cooperating with the clutch member 80 carried by the sprocket and which with the sprocket is loosely mounted on the shaft. By throwing these clutches in or out, the sprocket wheel is operative to drive the shaft or runs and has an idler thereon. Any conventional operating means for the clutches may be provided and preferably embody the usual fork operating in the annular groove of the clutch member 78.

It is thus obvious that the invention provides for the thorough cleaning of the cotton and of the separation of the refuse therefrom and then feeds the cotton to the gin, the feed being automatic and responsive to conditions within the gin.

Having thus described my invention, I claim:

1. In a machine of the character described, a casing, having a cotton inlet, a cotton outlet, a main refuse outlet and an auxiliary refuse outlet, a false bottom in said casing having an upper reticulated portion, a lower reticulated portion and an intermediate inclined imperforate portion, a pair of feed rollers in the casing adjacent the cotton inlet, a picker cylinder receiving the cotton from the feed rollers and delivering it against the upper reticulated portion of the false bottom, a pair of picker rolls engaging the cotton to carry it across the lower reticulated portion, a saw cylinder receiving the cotton from the picker rolls, a stripper cooperating with the saw cylinder, a spike cylinder arranged in cooperative relation with the stripper and the picker rolls and adapted to discharge the refuse to the auxiliary outlet, a doffer brush cooperating with the saw cylinder to deliver the cotton to the cotton outlet, and a conveyor for the refuse arranged in said casing below the false bottom and extending through the refuse outlet.

2. In a machine of the character described, a casing, a false bottom in said casing having an upper reticulated portion, a lower reticulated portion and an intermediate inclined imperforate portion, a pair of feed rollers in the casing, a picker cylinder receiving the cotton from the feed rollers and delivering it against the upper reticulated portion of the false bottom, a pair of picker rolls engaging the cotton to carry it across the lower reticulated portion, a saw cylinder receiving the cotton from the picker rolls, a stripper cooperating with the saw cylinder, a spike cylinder arranged in cooperative relation with said stripper and said picker rolls and having its teeth spirally arranged, a doffer brush for the saw cylinder and a conveyor for the refuse arranged in said casing below the false bottom.

3. In a machine of the character described, a casing, a false bottom in said casing having an upper reticulated portion, a lower reticulated portion and an intermediate inclined imperforate portion, a pair of feed rollers in the casing, a picker cylinder receiving the cotton from the feed rollers and delivering it against the upper reticulated portion of the false bottom, a pair of picker rolls engaging the cotton to carry it across the lower reticulated portion, a saw cylinder receiving the cotton from the picker rolls, a stripper cooperating with the saw cylinder, a spike cylinder arranged in cooperative relation with said stripper and said picker rolls, a doffer brush for the saw cylinder, and a conveyor for the refuse arranged in said casing below the false bottom.

4. In a machine of the character described, a casing, a false bottom in said casing having an upper reticulated portion, a lower reticulated portion and an intermediate inclined imperforate portion, a pair of feed rollers in the casing, a picker cylinder receiving the cotton from the feed rollers and delivering it against the upper reticulated portion of the false bottom, a pair of picker rolls engaging the cotton to carry it across the lower reticulated portion, a saw cylinder receiving the cotton from the picker rolls, a stripper cooperating with the saw cylinder, a spike cylinder arranged in cooperative relation with said stripper and said picker rolls, and a doffer brush for the saw cylinder.

5. In a machine of the character described, a casing, a pair of feed rollers in the casing, a picker cylinder, a pair of picker rolls, a saw cylinder, a stripper, a spike cylinder, a doffer brush, an endless conveyor, means for driving the saw cylinder, and means for driving the feed rollers, picker cylinder, picker rolls, stripper, spike cylinder, and doffer brush from the saw cylinder, and a clutch for the stripper and a clutch for the spike cylinder, whereby the stripper and the spike cylinder may remain idle.

6. In a machine of the character described, a casing having a main refuse outlet and an auxiliary refuse outlet, means for subjecting the cotton to a cleaning action and discharging the foreign matter separated therefrom to the main refuse outlet, means for hulling the cotton and removing all of the foreign matter therefrom and delivering the hulls and foreign matter to the auxiliary refuse outlet, including a picker roll, a saw cylinder, a stripper cooperating with the saw cylinder, and a spike roller and partition associated with said stripper and said spike roller having a deflecting surface whereby the refuse matter is delivered by the spike roller to the auxiliary refuse outlet.

7. In a machine of the character described, a casing having a main refuse outlet and an auxiliary refuse outlet, means for subjecting the cotton to a cleaning action and discharging the foreign matter separated therefrom to the main refuse outlet, means for hulling the cotton and removing all of the foreign matter therefrom and delivering the hulls and foreign matter to the auxiliary refuse outlet, a saw cylinder, a stripper cooperating with the saw cylinder, and a spike roller and partition associated with said stripper and said spike roller having a deflecting surface whereby the refuse matter is delivered by the spike roller to the auxiliary refuse outlet.

8. In a machine of the character described, a casing having a main refuse outlet and an auxiliary refuse outlet, means for subjecting the cotton to a cleaning action and discharging the foreign matter separated therefrom to the main refuse outlet, means for hulling the cotton and removing all of the foreign matter therefrom including a saw cylinder, a stripper cooperating with the saw cylinder and a spike cylinder adapted to deliver the refuse to the auxiliary refuse outlet.

9. In a machine of the character described, a casing having a main refuse outlet and an auxiliary refuse outlet, means for subjecting the cotton to a cleaning action and discharging the foreign matter separated therefrom including a spike roller having its teeth spirally arranged and a partition having a deflecting surface associated with the spike roller whereby the refuse is delivered by the spike roller to the auxiliary refuse outlet.

10. In a machine of the character described, a casing having a main refuse outlet and an auxiliary refuse outlet, means for subjecting the cotton to a cleaning action and discharging the foreign matter separated therefrom including a spike roller having its teeth spirally arranged and adapted to deliver the refuse to the auxiliary refuse outlet.

11. In a machine of the character described, a casing having a main refuse outlet and an auxiliary refuse outlet, means for subjecting the cotton to a cleaning action and discharging the foreign matter separated therefrom to the main refuse outlet, means for hulling the cotton and removing all of the foreign matter therefrom and delivering the hulls and foreign matter to the auxiliary refuse outlet.

12. In a machine of the character described, a casing having a main refuse outlet and an auxiliary refuse outlet, a false bottom in said casing having a reticulated portion communicating with the main refuse outlet, means engaging the cotton and cooperating with the reticulated portion of the false bottom to clean the cotton and deliver the foreign matter therefrom to the main refuse outlet, means for hulling the cotton and removing all of the foreign matter therefrom and delivering the hulls and foreign matter to the auxiliary outlet, and a screw conveyor arranged in the casing below the false bottom for carrying off the foreign matter from the main refuse outlet and the auxiliary refuse outlet.

13. In a machine of the character described, a casing having a main refuse outlet and an auxiliary refuse outlet, a false bottom in said casing having a reticulated portion communicating with the main refuse outlet, means engaging the cotton and cooperating with the reticulated portion of the false bottom to clean the cotton and deliver the foreign matter therefrom to the main refuse outlet, and means for hulling the cotton and removing all of the foreign matter therefrom and delivering the hulls and foreign matter to the auxiliary outlet.

JOSEPH LUTHER HART.